(12) United States Patent
Steinbeck et al.

(10) Patent No.: US 7,529,362 B1
(45) Date of Patent: May 5, 2009

(54) SYSTEM, METHODS, AND COMPUTER-READABLE MEDIUM FOR TRACKING, RECONCILING, AND REPORTING ON DTMF DATA AND VOICE DATA COMMUNICATED BETWEEN CALL CENTERS AND USERS

(75) Inventors: Michelle L. Steinbeck, Omaha, NE (US); Joel G. Mason, Omaha, NE (US)

(73) Assignee: West Corporation, Omaha, NE (US)

( * ) Notice: Subject to any disclaimer, the term of this patent is extended or adjusted under 35 U.S.C. 154(b) by 1276 days.

(21) Appl. No.: 10/607,504

(22) Filed: Jun. 26, 2003

(51) Int. Cl.
*H04M 3/00* (2006.01)
*H04M 5/00* (2006.01)

(52) U.S. Cl. ............ 379/265.02; 379/264; 379/265.01; 379/283

(58) Field of Classification Search ............ 379/265.02, 379/265.01, 264, 283, 339; 704/246; 370/352, 370/354
See application file for complete search history.

(56) References Cited

U.S. PATENT DOCUMENTS

| | | | |
|---|---|---|---|
| 5,414,755 A | 5/1995 | Bahler | |
| 5,623,539 A | 4/1997 | Bassenyemukasa | |
| 5,940,476 A | 8/1999 | Morganstein | |
| 6,119,084 A | * 9/2000 | Roberts et al. | ............... 704/246 |

OTHER PUBLICATIONS

Voicelog, VoiceLog Announces Inbound That Delivers, Press Release, www.voicelog.com, Oct. 2, 2000.

* cited by examiner

*Primary Examiner*—Thjuan K Addy

(57) ABSTRACT

Automated, computer-based systems, method, and computer-readable media for tracking, reconciling, and reporting on data representing Dual Tone Multi-Frequency (DTMF) tones and voice signals communicated between call center and users during interactions therebetween. The system can include a data store adapted to store the DTMF data and converted text corresponding to the voice signals; a transcription process receiving data representing the voice signal and converting it into corresponding text; a report generation process obtaining the DTMF data and the text, transmitting a report containing the same to a client, and updating the data store accordingly; and a reconciliation process receiving data enabling reconciliation of data as tracked by the call center and as tracked by an entity other than the call center. Methods provided by the invention can be practiced using the systems described herein or with other systems.

181 Claims, 6 Drawing Sheets

SYSTEM, METHODS, AND COMPUTER-READABLE MEDIUM FOR TRACKING, RECONCILING, AND REPORTING ON DTMF DATA AND VOICE DATA COMMUNICATED BETWEEN CALL CENTERS AND USERS

BACKGROUND

The present invention is generally related to voice data communicated between call centers and users. More specifically, to systems, methods and computer-readable medium for tracking, reconciling, and reporting on data representing at least one Dual Tone Multi-Frequency (DTMF) tone and at least one voice signal that are communicated between at least one call center and at least one user.

BRIEF SUMMARY OF THE INVENTION

An automated computer-based system for tracking, reconciling, and reporting on data representing at least one Dual Tone Multi-Frequency (DTMF) tone and at least one voice signal. The at least one Dual Tone Multi-Frequency (DTMF) tone and at least one voice signal are communicated between at least one call center and at least one user during at least one interaction therebetween. The system comprises following: at least one data store adapted to store at least first data representing the at least one DTMF tone; at least one transcription process adapted to receive data representing the at least one voice signal and to convert it into corresponding text. There is at least one report generation process adapted at least to obtain at least the first data and the corresponding text. The report process then transmits at least one report to at least one client including financial institutions subject to regulatory requirements, the report containing at least the first data, the voice signal and the corresponding text. The report process then updates the at least one data store wherein the data store allocates a space for and stores at least one of a plurality of records, in response to transmission of the report; and at least one reconciliation process communicating with the at least one data store to receive data enabling reconciliation of data as tracked by the at least one call center. The call center includes a facility, either an in-house facility or at a merchant location or an out-sourced facility to a third-party. The reconciliation process communicating with the at least one data store to receive data enabling reconciliation of data as tracked by the at least one call center as tracked by at least one entity other than the at least one call center, and being adapted to calculate and display reconciliation data at least to the at least one call center.

An automated, computer-based method for tracking, reconciling, and reporting on data representing at least one Dual Tone Multi-Frequency (DTMF) tone and at least one voice signal that are communicated between at least one call center and at least one user during at least one interaction therebetween. The method comprises storing DMTF data provided by a given user in a first data store; storing voice data provided by a given user in a second data store; transcribing the voice data into corresponding text; storing the corresponding text into a voice capture database. Once the captured, merging the DTMF data with the corresponding text and the voice data and populating a master database with data from the first data store. At least some of the date is then extracted from the master database and compiled into a report based on the extracted data. The report is sent to the client; including transmitting data to the master database representing regarding when the report was sent to the client and reconciling the data in the report sent to the client with data stored in the master database. Finally, displaying data resulting from the reconciliation.

An automated, computer-based method for tracking, reconciling, and reporting on data representing at least one Dual Tone Multi-Frequency (DTMF) tone and at least one voice signal that are communicated between at least one call center and at least one user during at least one interaction therebetween. The method comprising capturing first data representing at least one DTMF tone generated during a first interaction between at least one call center and at least one user during at least one interaction. Once completed, capturing a second data representing at least one voice signal generated during the first interaction and creating at least one record to store the first and the at least second data and the voice signal. After the record is generated, determining a completeness parameter associated with the record and generating at least one report containing at least in part the at least one record, and transmitting the at least one report.

BRIEF DESCRIPTIONS OF THE DRAWINGS

DETAILED DESCRIPTION

Systems

Figure 1:
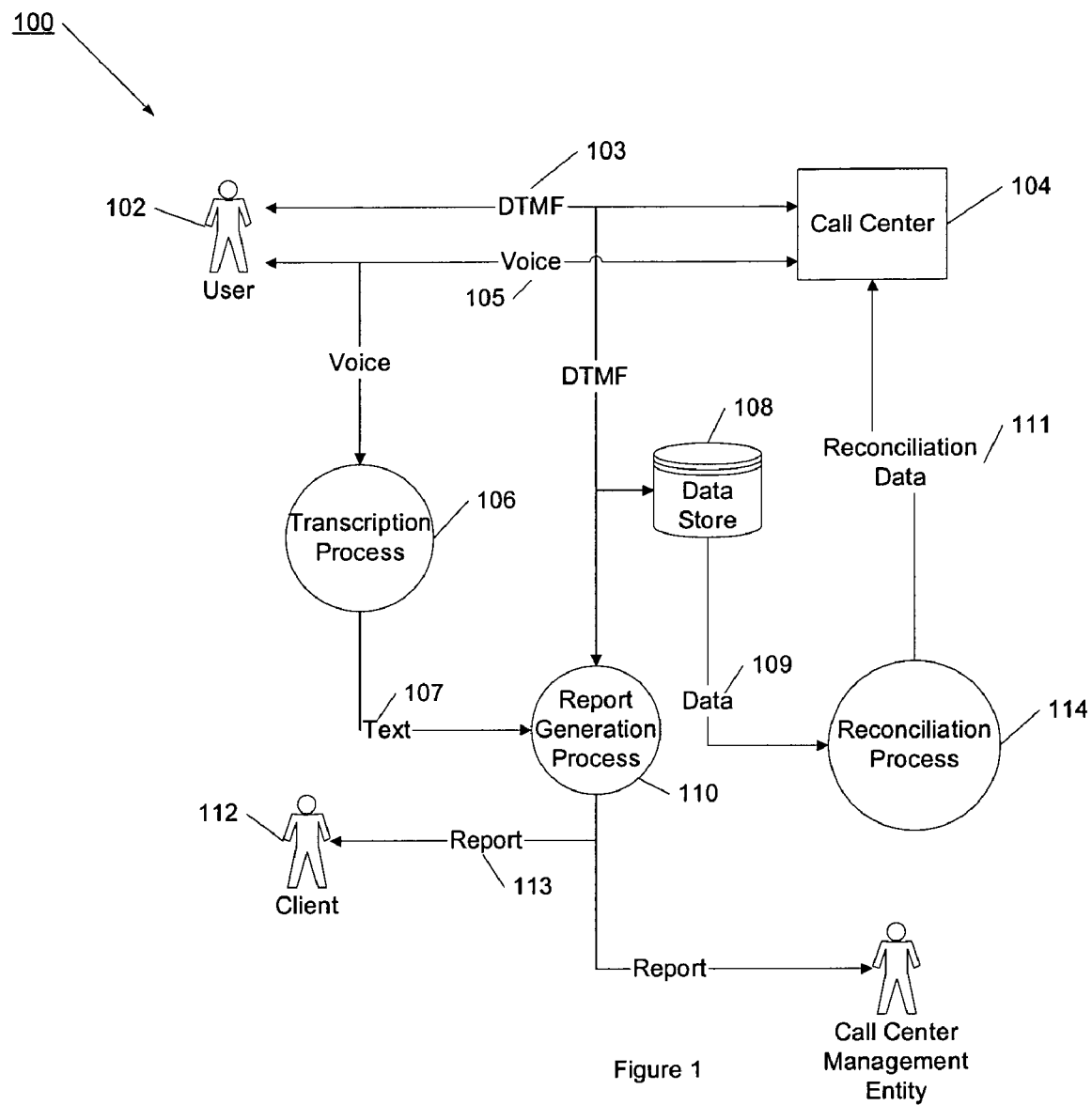
FIG. 1 is a block diagram illustrating various components and data flows related to a system provided according to various illustrative embodiments of the invention.

FIG. 1 is a block diagram illustrating various components and data flows related to a system 100 provided according to various illustrative embodiments of the invention. One aspect of the instant invention provides an automated, computer-based system 100 for tracking, reconciling, and reporting on data representing one or more dual-tone multi-frequency (DTMF) tones 103 and one or more voice signals 105 that are communicated between one or more call centers 104 and one or more users 102 during at least one interaction therebetween. As a definitional matter, the term "user" herein refers to persons who may either contact or be contacted by a call center 104. From the call center's perspective, the former case can be characterized as an inbound contact and the latter case as an outbound contact. The invention as disclosed and claimed herein may be applicable in either context. The term "call center" herein refers to any facility, either in-house at a given merchant or outsourced to a third party, wherein calls are received or placed. The term "interaction" refers to any contact conducted between the user 102 and the call center 104, most typically but not exclusively a telephone call originated by either the user 102 or the call center 104.

Data Stores

The system 100 can comprise one or more data stores 108 that are adapted to store, inter alia, data that represents the one or more DTMF tones 103 received from a given user 102 or users. Alternatively, several respective data stores, such as IVR master record storage 108a and voice record storage 108b shown in FIG. 2, can be provided to store data representing voice signals 105, DTMF tones 103, transcribed text 107, and other data as described herein, or at least some of this data can be combined for storage in the same data store 108.

The term "data store" herein refers to any storage medium capable of storing data, whether realized using semiconductor, magnetic, or optical technology. This term can also include abstract data structures supported by any number of programming languages, with non-limiting examples including queues, stacks, linked lists or the like, all of which are implemented at the machine level by disk storage, semiconductor memory, optical media, or the like. If the data store 108 is implemented as a database, this database can take the form of a relational database, an object-oriented database, and any combination thereof, or any other known database technology. Suitable database server programs are readily available from a variety of vendors, including IBM/Informix, Microsoft, Oracle, or the like.

Figure 4A:
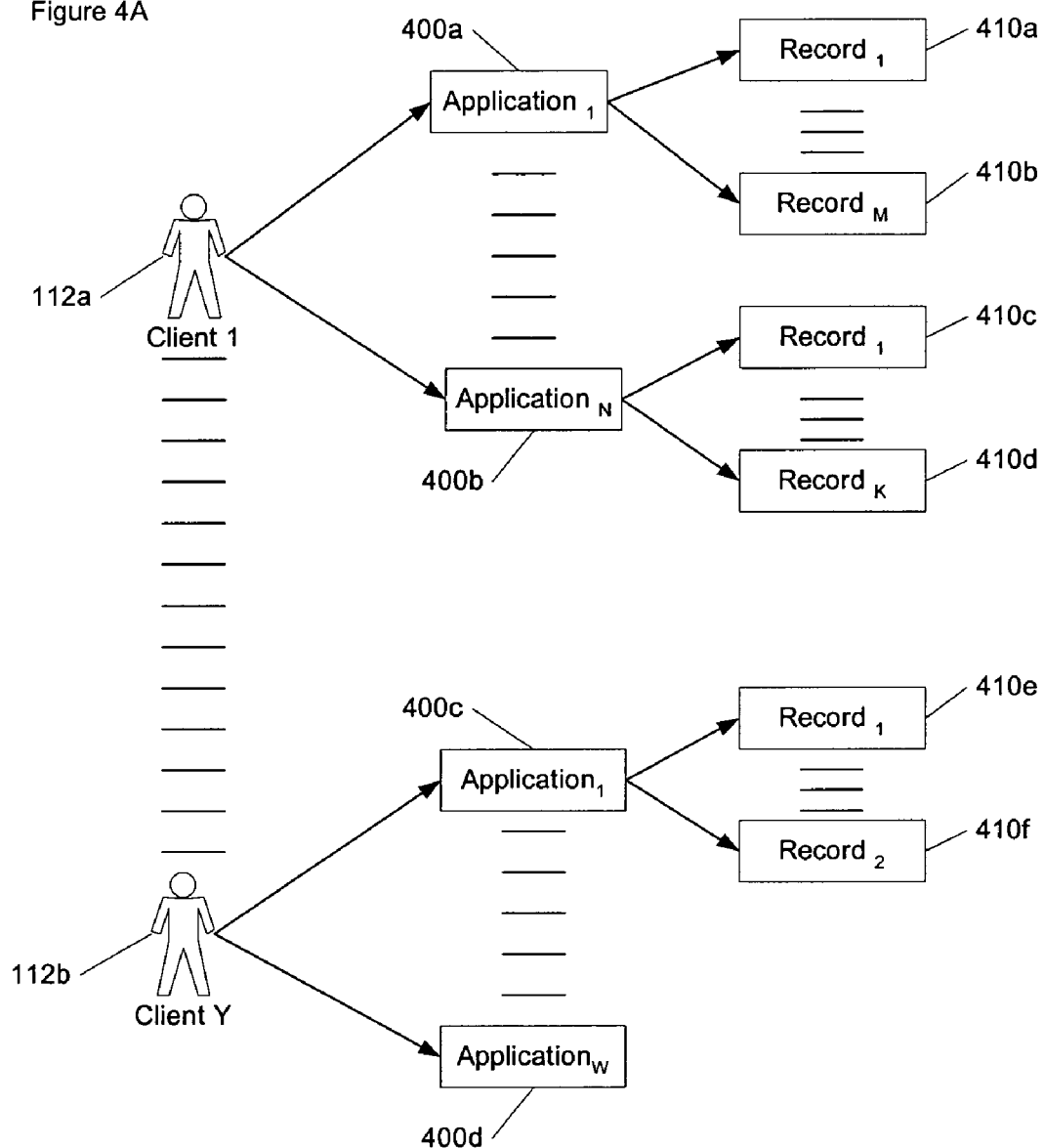
FIG. 4A is a block diagram illustrating relationships between clients, applications, and records provided according to various illustrative embodiments of the invention.
Figure 4B:
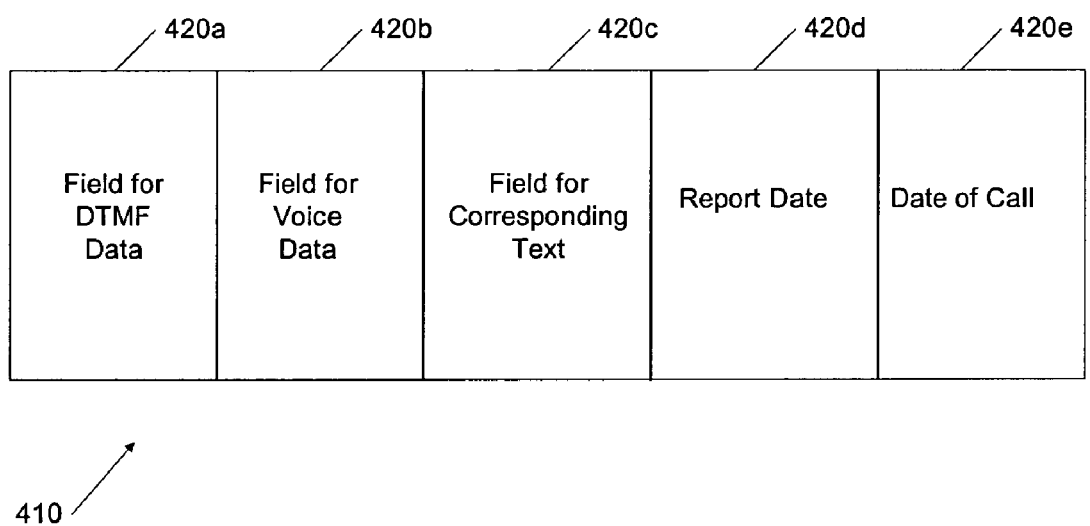
FIG. 4B is a diagram illustrating a data structure suitable for storing various data as collected and generated by various illustrative embodiments of the invention.

Turning to FIG. 4B, a diagram illustrating a data structure suitable for storing various data as collected and generated by various illustrative embodiments of the invention. The one or more data stores 108 can allocate space for and store one or more discrete records 410, each of which records 410 can contain respective fields 420a-f for at least some of the DTMF data (420a), the voice data (420b), text corresponding to the voice data (420c), reporting date (420e), or date of call (420f). Other fields can be provided to store data such as load dates, edit dates, or the like. As known in the database arts, a "record" refers to a group of related data items that can be processed as a discrete unit, while "fields" refer to individual storage locations defined within a given record.

Turning to FIG. 4A, a block diagram illustrating relationships between clients, applications, and records provided according to various illustrative embodiments of the invention. The data store 108 can host a plurality of respective records 410a-f that contain given instances of DTMF data, voice data, and/or text data corresponding to the voice data, as well as other data discussed below, which data are obtained from given users 102 by one or more call centers 104 while supporting one or more given applications 400a-d on behalf of one or more clients 112a and 112b. These various data can be stored within respective fields 420 allocated within a given record 410. These fields 420 may be associated with one another to reflect their status as having been captured during a given interaction between a user 102 and a call center 104, including, as a non-limiting example, the fields 420a containing DTMF data and fields 420c containing text data corresponding to voice signals 105 captured during the interaction. This association can result from the fields 420 being part of a given record 410 allocated for a given interaction, or can result from the fields 420 themselves being allocated separately from mass storage (such as a stack or heap) and then linked with other fields 420 for a given interaction or with a record 410 allocated for the given interaction. These various methods of association can be performed using pointers or index fields or files as well known in the art.

Transcription Process

Returning to FIG. 1, one or more transcription processes 106 can be adapted to receive data 105 representing the one or more voice signals, and to convert or transcribe them into corresponding text 107. In different embodiments of the invention, the transcription process or entity 106 can take different forms. The transcription process 106 can operate as a third-party relative to the call center 104 and the at least one user 102, or can operate as an in-house entity relative to the call center 104. The transcription process(es) 106 can be realized as an automated system that converts the voice signal 105 substantially without human intervention. In the context of this description, "substantially without human intervention" refers to a transcription process 106 wherein human interaction is possibly necessary to initiate the transcription process 106 and occasionally trouble-shoot or remedy malfunctions, but wherein the process itself functions automatically in the normal course without active human participation. Conventional speech recognition engines may be suitable for realizing the transcription process 106. In other embodiments, transcription is done by a transcription entity 106 such as a live operator, or by an automated system that at least assists a live operator in converting the voice signal 105 into text 107.

Turning to the transcription process 106 in more detail, this process can receive or be forwarded a plurality of voice signals 105 and convert the same into corresponding text 107. "Voice signals" in this context can correspond to the waveforms corresponding to one spoken word, multiple words, or parts of a single word, depending on the technology used to implement the transcription process 106.

The transcription process 106 may communicate with a load process (not shown) that is adapted to populate a data store record 410 or field 420 with the corresponding text 107 once this text 107 is available from the transcription process 106. A suitable but non-limiting example of a load process would be a suitably constructed LOAD statement as known in SQL or other database languages.

Report Generation Process

One or more report generation processes 110 can obtain at least data representing the one or more DTMF tones 103 and the corresponding text 107, and transmit one or more reports 113 containing at least the DTMF data 103 and the corresponding text 107 to one or more clients 112. The report generation process 110 can update the one or more data stores 108 (see link 203 in FIG. 2) to reflect which data have been reported or transmitted to the client 112.

One function of the report generation process 110 is to determine when a record 410 allocated for a given interaction is complete and can be reported to the corresponding client 112. In one embodiment, the client 112 for whom the interaction is performed may specify what constitutes a complete record 410 suitable for reporting. In the outsourced call center context, the call center 104 may assist a plurality of different clients to track and meet respective reporting requirements. Where the clients 112 are financial institutions, the clients 112 may be subject to regulatory requirements mandating that each interaction with users 102 be tracked, accounted-for, and dispositioned.

In other embodiments, the call center 104 itself may define what constitutes a complete record 410. In any event, the report generation process 110 would then compare a given record 410 to this specification to determine whether the record 410 is complete. As a non-limiting example, a given client 112 may require that all transaction records 410 reported to it must contain populated fields for at least DTMF data 103 and text 107 corresponding to the voice data 105 captured during the transaction. The report generation process 110 can check a given record 410 for completeness by traversing the record 410 and examining whether the required field or fields 420 in the record 410 are populated with data. The invention can also include error-checking data using pre-defined guidelines. In short, the report generation process 110 determines that each voice signal 105 required to be transcribed for a given interaction has been converted into corresponding text 107. Typically, the report generation process 110 determines that text 107 corresponding to a given voice signals 105 have been received from the transcription process 106.

Once the report generation process 110 determines that a given record 410 is ready to be reported, this process 110 extracts the contents of one or more fields 420 of the data store(s) 108 in response to respective reporting requirements established by one more given clients 112. Once the data are extracted from these fields 420, the contents thereof can be placed in intermediate or temporary storage if necessary during the report generation process. The report generation process 110 can also format the contents of these fields 420 into one or more reports 113 in response to respective formatting requirements specified by one or more respective clients 112.

In other embodiments of the invention, the report generation process 110 can extract data for and format reports 113 for transmission to call center management entities 114, whether such entities are live personnel, groups or teams, or automated processes that oversee operations of the call center 104. In such embodiments, the above teaching regarding extracting field contents, field requirements, reporting requirements, formatting requirements, or the like in the context of preparing reports 113 for clients 112 are equally applicable in the context of preparing management reports. These management reports can take the form of, for example, status or progress reports or can be identical to reports provided to the client 112.

Whether the reports 113 are provided to clients 112 or call center management 114, these reports 113 can be generated and delivered at any convenient time interval, or can track data gathered over such time interval. Non-limiting examples of such time intervals can include minute, hour, day, week, month, year, or other suitable unit of time. Further, these reports 113 can contain data reporting on any number of parameters. Non-limiting examples of such reports can include any of the following, with the numbers being reported as a grand total, a cumulative and/or partial total, or partial totals gathered over a given time interval:

- a number of records 410 generated over a given time period,
- a number of records 410 generated while supporting at least one specific application 400 (FIG. 4A).
- a number of records 410 generated while supporting at least one specific client 112, accounting for one or more separate applications 400,
- a number of voice signals 105 or records 410 that are awaiting transcription, either total, to-date, or over some time period, and/or
- total number of voice signals 105 or records 410 awaiting transcription, with the report 113 being organized by application 400 and/or by client 112.

The report generation process 100 can also report on records 410 that are considered "incomplete", in that they are not yet fully populated with the data required by the client 112 for whom the record 410 is being maintained. For example, given reports 113 can list a number of voice signals 105 that are awaiting transcription into corresponding text 102, either as a total number or a number generated over a time interval as discussed above. Further, these reports 113 can be organized by the transcription entity 106 to which the voice signal(s) 105 is sent, and can also track the time elapsed since the voice signal(s) 105 was sent. By tracking this date, the call center 104 can identify problems with a given transcription entity 106 by isolating those transcription entities 106 with a backlog of pending requests. The call center 104 can then pursue follow-up actions with the transcription entity 106 such as retracting previously-submitted requests, demanding faster resolution of pending requests, escalating the matter with the transcription entity 106, or routing future requests to other transcription entities 106. In any event, this tracking feature enables the call center 104 to identify and resolve relatively minor issues with transcription before they become major issues that impact the call center's ability to service its clients 112 in the context of real-time transcription, the reporting parameters discussed above, such as frequency of reports, can be adjusted accordingly.

As further non-limiting examples of reporting on incomplete records, the report generation process 110 can report on a number of voice records 410 that are acknowledged as received by one or more transcription entities 106, whether total or over one of the above time periods. This report can be further organized by the client 112 for whom the record 410 was generated, or a specific client application for which the record 410 is generated.

The report generation process 110 can also report on "spoils", which are those voice signals 105 that are incompletely transcribed and cannot reasonably be completely transcribed for any one of a variety of reasons, such as a garbled or distorted voice signal 105, computer hardware/software malfunctions that corrupt the voice signal 105 or prevent a voice signal 105 from being created, transmission line noise or other communications network-related issues that affect the voice signal 105, or the like. As noted above, if the client 112 is subject to 100% reporting requirements, it may be necessary for the call center 104 to track and report on "spoiled" voice signal 105.

The comments above regarding the content, frequency, and types of reporting done for complete or incomplete records 410 apply equally in the context of reporting on spoiled voice records. Non-limiting examples of reports 113 can include reporting on voice records 410 that are incompletely transcribed and can report total number or be organized by relevant time period (second, minute, hour, day, week, month, year, etc.). These reports 113 can also be organized by application 400, by client 112, by transcription entity 106, and any combination of the foregoing, or by other organizations criteria.

The report generation process 110 can also report specifically on "good" voice signals 105, which are those voice signals 105 that can be or are substantially completely transcribed into corresponding text 107. "Substantially" in this context refers to a transcription capturing all of the substantive meaning conveyed in the voice signal 105, while excluding extraneous material such as line noise, coughing, non-substantive conversation ("um", "uh", etc.), or the like.

The comments above regarding the content, frequency, and types of reporting, done for complete or incomplete records 410 apply equally in the context of reporting on "good" voice signals 105. Non-limiting examples of reports 113 can include reporting on voice records 105 that are completely transcribed and can be organized at least by relevant time period (second, minute, hour, day, week, month, year, etc.). These reports can also be organized by application 400, by client 112, by transcription entity 106, and any combination of the foregoing, or by other organizational criteria. In addition, these reports 113 can include entries for total number of records 410 that are or have been sent to respective clients 112, can be further organized by any of the time periods above, by application 400 supported on behalf of one or more clients 112, by relevant transcription entity 106, or by other organizational criteria.

Having generated the data required to compile the report 410, the report generation process 110 can transmit or send one or more respective reports 113 to one or more respective clients 112 or to a call center management entity 114. These reports 113 can be transmitted to the clients 112 or call center management entities 114 using any suitable transmission or communication technology as selected by those skilled in the art. Where call centers 104 host more than one application 400 for a given client 112, these reports 113 can list data relating to each respective application 400 supported on behalf of the given client 112. The report generation process 110 can store a date and/or a time at which respective records 400 reported to the corresponding client 112 are, for example, in a field 420e shown in FIG. 4B. In this embodiment, one or more fields 420e in the data store 118 can be marked as having had their contents reported to the corresponding client 410, as well being marked with the date and/or time of such reporting.

Those skilled in the art will recognize that, in light of the teaching herein, the report generation process 110 can readily be implemented using query commands formulated using known database software.

Reconciliation Process

One or more reconciliation processes 114 can be adapted to communicate with the one or more data stores 118 to receive data enabling reconciliation of data as tracked by the call center(s) 104 and as tracked by one or more entities other than the call center. The reconciliation process(es) 114 can be adapted to calculate and display reconciliation data 111, as well as reports (represented by reference numeral 113) compiled from such data, to call center management and/or to clients. In general, the function of the reconciliation process 114 is to reconcile one or more parameters as tracked by one or more call centers 104 with corresponding parameters as tracked by a second entity other than the call center 104, or to ensure that a count of a general item equals a count of specific items constituting the general item. These second entities could be clients 112, transcription service providers 106, or the like. As discussed above in connection with the report generation process 110, these reconciliation reports 111 could provide total counts, cumulative counts, counts to-date, data gathered per unit time, or any other convenient method of reporting.

Non-limiting examples of the types of parameters that can be tracked and reconciled by the reconciliation process 114 can include any of the following:

a count of voice signals 105 sent to a given transcription process 106 versus a count of corresponding text records 107 received from the transcription process 106. This difference should reveal how many records are "pending" or in "queue" at the transcription process 106. If this difference exceeds a given threshold, this may indicate a problem with the transcription process 106.

a count of records sent to a transcription process 106 versus a count of records acknowledged as received by the transcription process 106. Any difference between these counts could indicate a problem with the transcription process 106, or with the communication link between the call center 104 and the transcription process 106.

a status of each of interaction conducted by the call center 104. As a non-limiting example, this report 111 could categorize each voice signal 105 received by the at least one call center 104 as at least one of the following: a complete record 410 that has all required fields populated, an incomplete record 410 that does not yet have all required fields populated. For each field 420 within the record 410, the report 111 can characterize such fields 420 as containing a good transcription, and a failed transcription (or "spoil").

counts of records 410 created by the call center 104 versus counts of records 410 reported by the call center 104 to a given client 112. A difference in these counts indicates how many records 410 are "pending" or in "queue" at the call center 104, and a significant increase in this difference could indicate potential problems with call center processing. In turn, these problems could be traceable to issues with transcription, or problems with a communication link between the call center 104 and given client 112. For a call center management entity 114 that oversees multiple call centers 104, an increasing backlog or queue at a given call center 104 may indicate a need to follow-up with that specific call center 104 to avoid alienating clients 112. The invention can include reporting on such backlogs, or other matters described herein, in real-time with the occurrence of the detection of the backlog, and preferably in real-time with the occurrence of the circumstances causing the backlog. "Real-time" as used herein refers to a second event occurring without perceived delay after a first event.

Merge Process

Figure 3:
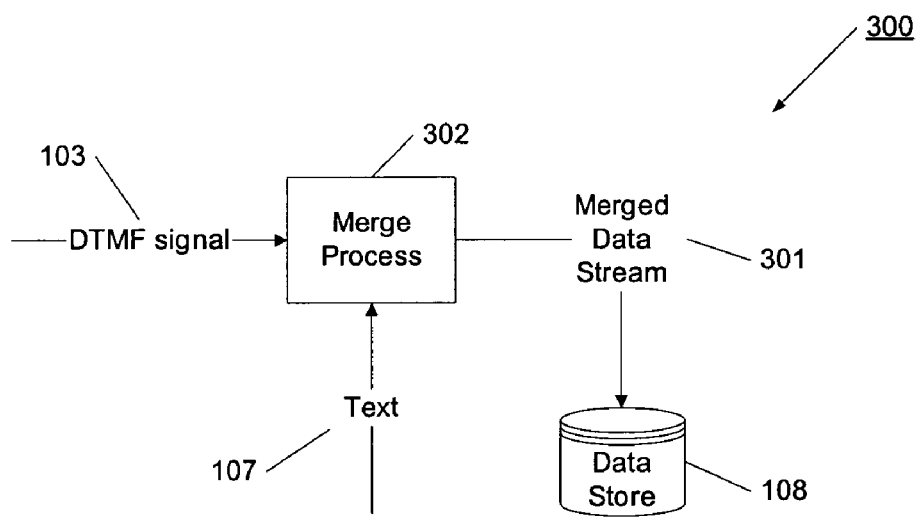
FIG. 3 is a block diagram illustrating data flow associated with a merge process provided according to various illustrative embodiments of the invention.

FIG. 3 is a block diagram illustrating data flow associated with a merge process provided according to various illustrative embodiments of the invention. One or more merge processes 302 can match the DTMF tones 103 captured during a given interaction with text 107 corresponding to the at least one voice signal 105 captured during the given interaction. The merge process 302 can associate a DTMF tone 103 captured during a given interaction with text corresponding to at least one voice signal 105 captured during the given interaction, or can create one or more merged data streams 301 that include records 410 containing, for a given interaction, data representing DTMF tone(s) 103 and text 107 corresponding to voice signals 105 captured during that interaction, as well as the voice signals 105 themselves in some embodiments.

Voice Response Unit

Figure 2:
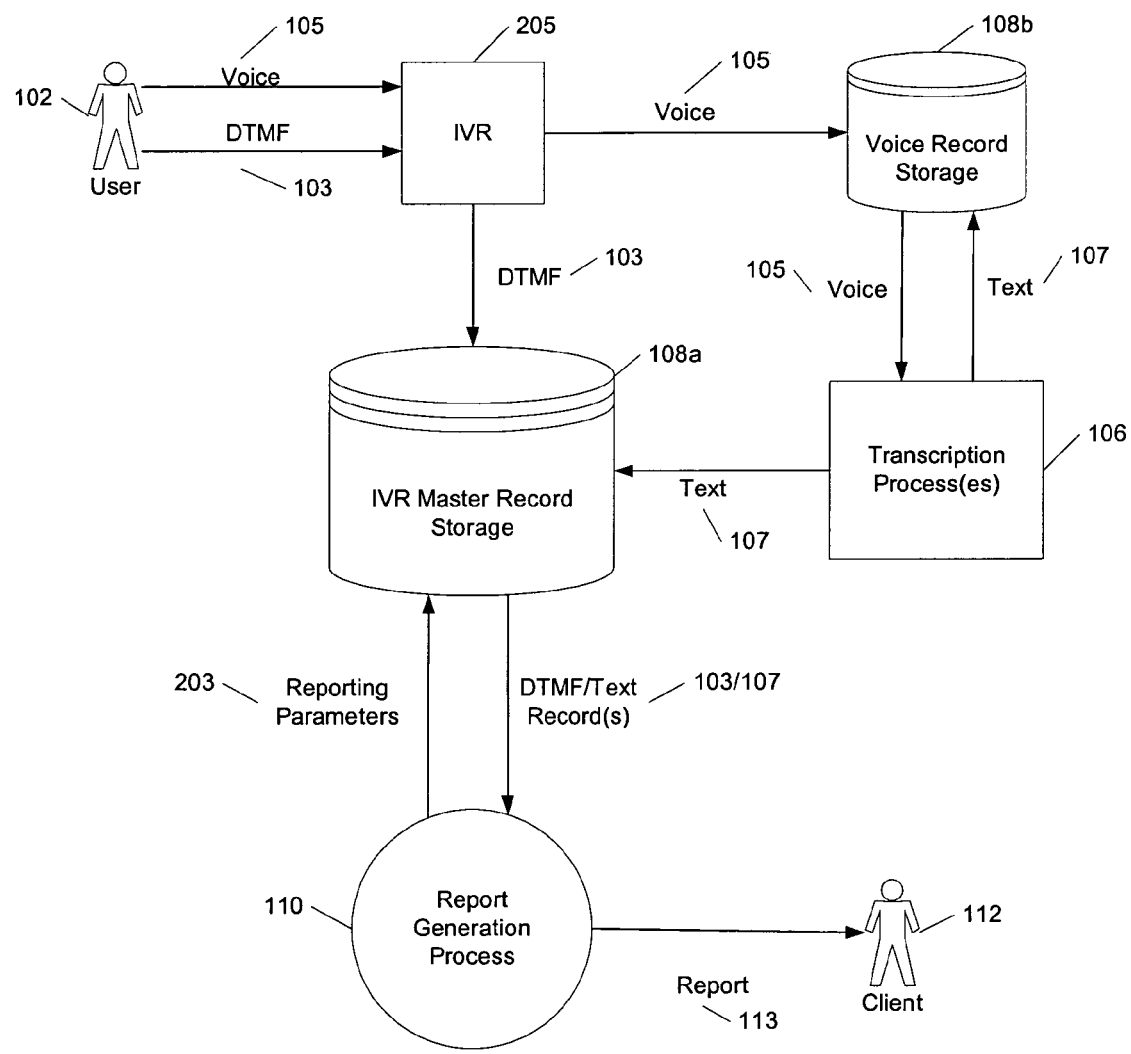
FIG. 2 is a block diagram illustrating various components and data flows related to a system provided according to various further illustrative embodiments of the invention.

FIG. 2 is a block diagram illustrating various components and data flows related to a system provided according to various further illustrative embodiments of the invention. A system 200 provided according to alternative embodiments of the invention can include a voice response unit (VRU) 205 adapted to capture data representing one or more DTMF tones 103 from a given user 102 interacting with the call center 104, or a plurality of respective DTMF tones 103 obtained from a plurality of such users 102. VRUs are also referred to in the industry as interactive voice response (IVR) units.

The voice response unit 205 can support multiple call center applications 400 on behalf of multiple call center clients 112 by capturing respective data representing a plurality of DTMF tones 103 or voice signals 105 from a plurality of users 102, wherein respective users 102 are calling for different respective programs or applications 400 that are supported on behalf of different clients 112 by one or more call centers 104. In the multiple call center context, the various call center facilities may or may not be affiliated with one another.

DETAILED DESCRIPTION

Methods and Computer Readable Media

Figure 5:
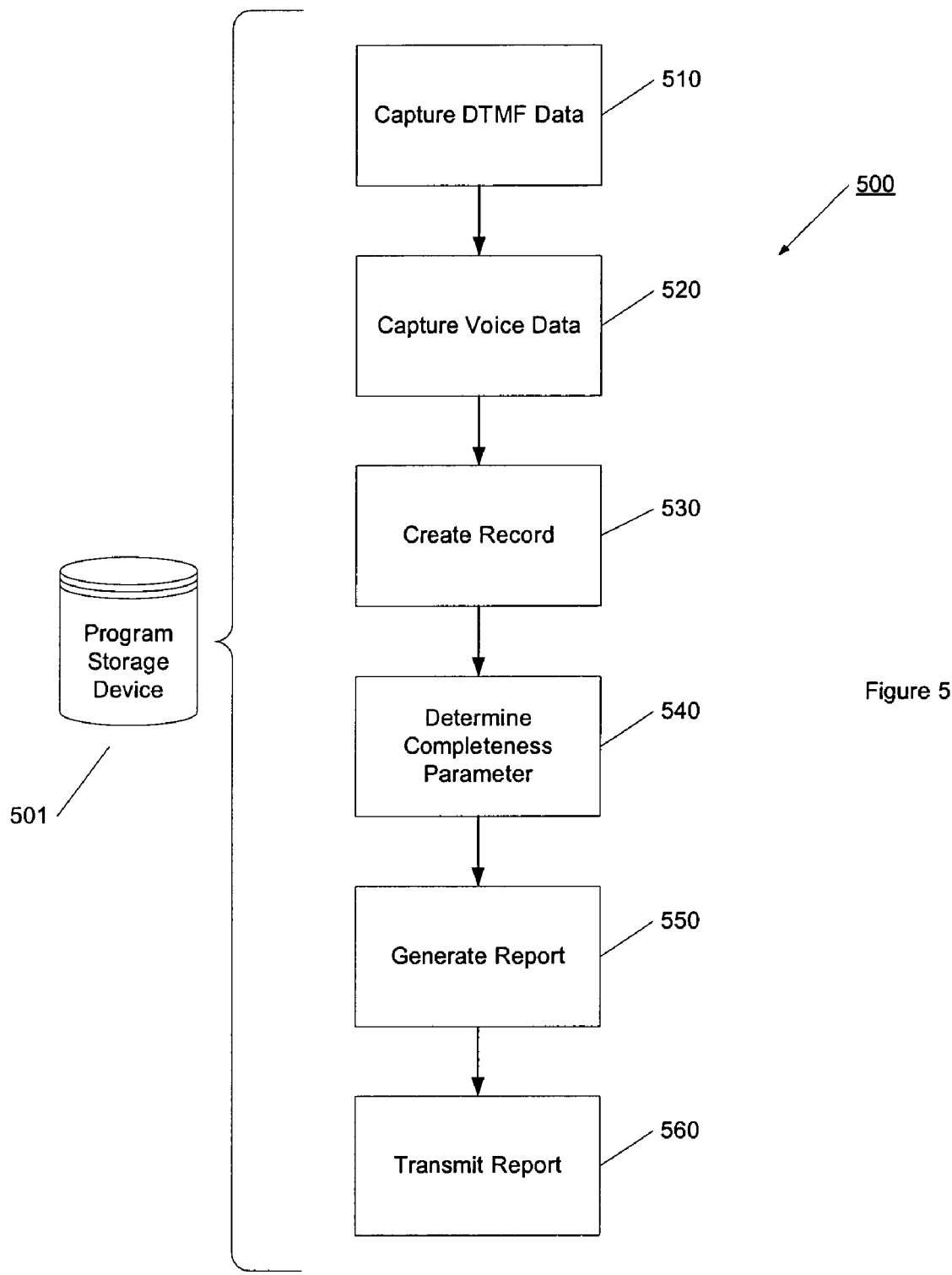
FIG. 5 is a flowchart illustrating process flow provided according to various illustrative embodiments of the invention.

FIG. 5 is a flowchart illustrating process flow provided according to various illustrative embodiments of the invention. The invention also provides methods for tracking, reconciling, and reporting on data that is generated during interactions between one or more call centers and one or more users contacting the call center. An illustrative method 500 can be conducted in connection with the above-discussed system components or with other systems or components, and can comprise at least the following. In block 510, data is captured that represents one or more DTMF tones 103 generated during a given interaction between a user 102 and a call center 104. In block 520, data is captured that represents one or more voice signals 105 generated during the given interaction. In block 530, one or more records 420 are created to store the DTMF data 103 and the voice data 105. In block 540, a completeness parameter indicating whether the one or more records 420 are complete is established. In block 550, one or more reports 113 are generated that contain at least in part the one or more records 420. The one or more reports 112 are finally transmitted to one or more recipients. Non-limiting examples of such recipients can include one or more clients 112 serviced by a call center 104 or one or more management entities 114 associated with the call center 104.

The specification above describes numerous variations of the above general method in the context of the system components discussed therein. Those skilled in the art will understand that these method steps could be practiced using either the system components disclosed above, or could be practiced independently of those system components, as contemplated in the method claims attached hereto.

Those skilled in the art will recognize that the format content, and layout of the data structures and flowcharts as shown herein are shown only for convenience, clarity, and conciseness in describing illustrative embodiments of the invention. Those skilled in the art will also recognize that the invention is not limited to the data structure and flowcharts as shown herein, but instead that the arrangement, layout, format, order and content of such flowcharts and data structures could be altered, for example by adding, modifying, or deleting fields from data structures, by adding processing, or the like without departing from the scope of the invention.

A suitable application program can implement software residing on the computer-readable medium or media 501 (FIG. 5) and embodying the various aspects of the method discussed herein and shown in the drawing figures, and can be coded using any suitable programming, database access, or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like.

As those skilled in the art will understand, the program of instructions can be loaded and stored onto a program storage medium or device 501 readable by a computer or other machine, embodying a program of instructions executable by the machine to perform the various aspects of the invention as discussed and claimed herein, and as illustrated in the drawing figures. Generally speaking, the program storage medium 501 can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 501 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

We claim:

1. An automated, computer-based system for tracking, reconciling, and reporting on data representing at least one Dual Tone Multi-Frequency (DTMF) tone and at least one voice signal that are communicated between at least one call center and at least one user during at least one interaction therebetween, the system comprising at least the following:

at least one data store adapted to store at least first data representing the at least one DTMF tone;

at least one transcription process adapted to receive data representing the at least one voice signal and to convert it into corresponding text;

at least one report generation process adapted at least to:

obtain at least the first data and the corresponding text, transmit at least one report to at least one client, including financial institutions subject to regulatory requirements, the report containing at least the first data, the at least one voice signal and the corresponding text, and update the at least one data store, wherein the data store allocates a space for and stores at least one of a plurality of records, in response to transmission of the at least one report; and at least one reconciliation process communicating with the at least one data store to receive data enabling reconciliation of data as tracked by the at least one call center, wherein the call center includes a facility, either an in-house facility or at a merchant location or an out-sourced facility to a third-party, and as tracked by at least one entity other than the at least one call center, and being adapted to calculate and display reconciliation data at least to the at least one call center.

2. The system of claim 1, further comprising at least one merge process adapted to match the at least one DTMF tone captured during a given interaction with text corresponding to the at least one voice signal captured during the given interaction.

3. The system of claim 2, wherein the at least one merge process is adapted to associate the at least one DTMF tone captured during the given interaction with text corresponding to at least one voice signal captured during the given interaction.

4. The system of claim 2, wherein the merge process is adapted to create at least one merged data stream includes data representing at least the at least one DTMF tone and the corresponding text.

5. The system of claim 2, wherein the merge process is adapted to create a merged data stream that contains data representing at least the at least one DTMF tone captured during a given interaction and data representing the at least one voice signal captured during the given interaction.

6. The system of claim 1, further comprising at least a second data store adapted to store at least one of the first data and the corresponding text.

7. The system of claim 1, wherein the at least one transcription process operates as a third-party relative to the at least one call center and the at least one user.

8. The system of claim 1, wherein the at least one transcription process operates as an in-house entity relative to the at least one call center.

9. The system of claim 1, further comprising at least one further transcription process adapted to convert data representing at least a further voice signal into corresponding text.

10. The system of claim 1, wherein the at least one transcription process is an automated system that converts the data representing the at least one voice signal substantially without human intervention.

11. The system of claim 1, wherein the at least one transcription process is an automated system that at least assists a live operator in converting the data representing at least one voice signal.

12. The system of claim 1, further comprising a voice response unit adapted to capture first data representing a plurality of DTMF tones obtained from a given user.

13. The system of claim 1, further comprising a voice response unit adapted to capture respective first data representing a plurality of DTMF tones obtained from a plurality of users.

14. The system of claim 1, further comprising a voice response unit adapted to capture respective first data representing a plurality of DTMF tones obtained from a plurality of users, at least two of which users are calling for two respective programs that are supported by the at least one call center on behalf of different clients of the at least one call center.

15. The system of claim 1, further comprising a voice response unit adapted to capture respective first data representing a plurality of DTMF tones obtained from a plurality of users contacting a plurality of call centers, at least two of which users are calling for two respective programs that are supported by respective ones of the plurality of call centers on behalf of different clients of the plurality of call centers.

16. The system of claim 1, further comprising a voice response unit adapted to capture second data representing a plurality of voice records obtained from the at least one user.

17. The system of claim 1, further comprising a voice response unit adapted to capture second data representing respective pluralities of voice records obtained from a plurality of users.

18. The system of claim 1, further comprising a voice response unit adapted to capture second data representing respective pluralities of voice records obtained from a plurality of users, at least two of which users are interacting with the at least one call center with respect to two respective programs that are supported by the at least one call center on behalf of different clients of the at least one call center.

19. The system of claim 1, further comprising a voice response unit adapted to capture second data representing a plurality of voice records obtained from a plurality of users contacting a plurality of call centers, at least two of which users are interacting with respective ones of the call centers with respect to two respective programs that are supported by respective ones of the plurality of call centers on behalf of different clients of the plurality of call centers.

20. The system of claim 1, wherein the at least one data store is adapted to store at least one record containing at least one of the first data and the corresponding text.

21. The system of claim 1, wherein the at least one data store is implemented as at least one relational database.

22. The system of claim 1, wherein the at least one data store is implemented as at least one object-oriented database.

23. The system of claim 1, wherein the at least one data store is adapted to store a plurality of respective records that contain given instances of the first data and data representing at least one voice signal that is obtained from given users by the at least one call center while supporting at least one application.

24. The system of claim 1, wherein the at least one data store is adapted to store a plurality of respective records that contain given instances of the first data and data representing that is obtained from given callers by the at least one call center while supporting a plurality of applications.

25. The system of claim 1, wherein the at least one data store is adapted to store a plurality of records that contain given instances of the first data and data representing that is obtained from given callers by a plurality of call centers that are supporting a plurality of applications.

26. The system of claim 1, wherein the at least one data store is adapted to support allocation of respective fields for storing the first data and the corresponding text.

27. The system of claim 1, wherein the at least one data store is adapted to store the first data and at least the corresponding text in respective fields allocated within at least one given record in the at least one data store.

28. The system of claim 1, wherein the at least one data store is adapted to associate a first field storing the first data with at least a second field storing at least the corresponding text.

29. The system of claim 1, wherein the at least one data store is adapted to associate a first field storing the corresponding text with at least a second field storing at least the first data.

30. The system of claim 1, wherein the at least one data store is adapted to associate the first data and the corresponding text using at least one of a pointer and an index.

31. The system of claim 1, wherein the report generation process is adapted to determine that at least one record storing at least the first data and the corresponding text is complete by comparing the at least one record to a specification applicable to the at least one record.

32. The system of claim 1, wherein the report generation process is adapted to determine that at least one record storing at least the first data and the corresponding text is complete by comparing the at least one record to a specification that is provided by a client and that is applicable to the at least one record.

33. The system of claim 1, wherein the report generation process is adapted to determine that at least one record storing at least the first data and the corresponding text is complete by examining whether at least one field in the at least one record is populated with data.

34. The system of claim 1, wherein the report generation process is adapted to determine that at least one record storing at least the first data and the corresponding text is complete by examining whether a plurality of fields in the at least one record are each populated with data.

35. The system of claim 1, wherein the transcription process is adapted to receive a plurality of voice signals and convert the same into corresponding text.

36. The system of claim 1, wherein the report generation process is adapted to determine that each voice signal required to be transcribed for a given interaction has been converted into corresponding text.

37. The system of claim 1, wherein the report generation process is adapted to determine that text corresponding to a given voice signal has been received from the at least one transcription process.

38. The system of claim 1, further comprising a load process adapted to populate a field of the at least one data store with the corresponding text.

39. The system of claim 1, wherein the report generation process is adapted to compare a plurality of populated fields in the at least one data store with a minimum set of populated fields required by at least a first client.

40. The system of claim 1, wherein the report generation process is adapted to compare a respective plurality of populated fields in the at least one data store with respective minimum sets of populated fields as required by a plurality of respective clients.

41. The system of claim 1, wherein the at least one report generation process is adapted to extract at least one content of at least one field of the at least one data store in response to at least one requirement of a given client.

42. The system of claim 1, wherein the at least one report generation process is adapted to format contents of a plurality of records of the at least one data store into at least one report in response to requirements specified by a plurality of respective clients.

43. The system of claim 1, wherein the at least one report generation process is adapted to provide the at least one report to a call center management entity.

44. The system of claim 1, wherein the at least one report generation process is adapted to provide at least one report that lists a total number of records generated over a given time period.

45. The system of claim 1, wherein the at least one report generation process is adapted to provide at least one report that lists a total number of records generated while supporting at least one specific application.

46. The system of claim 1, wherein the at least one report generation process is adapted to provide at least one report that lists a total number of records generated while supporting at least one specific client.

47. The system of claim 1, wherein the at least one report generation process is adapted to provide at least one report that lists a total number of voice records that are awaiting transcription.

48. The system of claim 1, wherein the at least one report generation process is adapted to provide at least one report that lists a total number of voice records awaiting transcription over a given time period.

49. The system of claim 1, wherein the at least one report generation process is adapted to provide at least one report that lists a total number of voice records awaiting transcription organized by application supported on behalf of at least one client.

50. The system of claim 1, wherein the at least one report generation process is adapted to provide at least one report that lists a total number of voice records awaiting transcription and that is organized by specific client.

51. The system of claim 1, wherein the at least one report generation process is adapted to provide at least one report that lists a total number of voice records awaiting transcription and that is organized by transcription entity.

52. The system of claim 1, wherein the at least one report generation process is adapted to provide at least one report that lists a total number of voice records acknowledged as received by at least one transcription entity.

53. The system of claim 1, wherein the at least one report generation process is adapted to provide at least one report that lists a total number of voice records acknowledged as received by at least one transcription entity and that is organized at least by time period.

54. The system of claim 1, wherein the at least one report generation process is adapted to provide at least one report that lists a total number of voice records acknowledged as received by at least one transcription entity and that is organized at least by a client for whom the voice record is generated.

55. The system of claim 1, wherein the at least one report generation process is adapted to provide at least one report that lists a total number of voice records acknowledged as received by at least one transcription entity and that is organized at least by an application for which the voice record is generated.

56. The system of claim 1, wherein the at least one report generation process is adapted to provide at least one report that lists a total number of voice records that are incompletely transcribed.

57. The system of claim 1, wherein the at least one report generation process is adapted to provide at least one report that lists a total number of voice records that are incompletely transcribed and which report is organized at least by time period.

58. The system of claim 1, wherein the at least one report generation process is adapted to provide at least one report that lists a total number of voice records that are incompletely transcribed and which report is organized at least by an application for which the voice records are generated.

59. The system of claim 1, wherein the at least one report generation process is adapted to provide at least one report that lists a total number of voice records that are incompletely transcribed and which report is organized at least by a client for which the voice records are generated.

60. The system of claim 1, wherein the at least one report generation process is adapted to provide at least one report that lists a total number of voice records that are incompletely transcribed and which report is organized at least by a transcription entity processing the voice records.

61. The system of claim 1, wherein the at least one report generation process is adapted to provide at least one report which report lists a total number of voice records that are completely transcribed.

62. The system of claim 1, wherein the at least one report generation process is adapted to provide at least one report that lists a total number of voice records that are completely transcribed and which report is organized at least by time period.

63. The system of claim 1, wherein the at least one report generation process is adapted to provide at least one report that lists a total number of voice records that are completely transcribed and which report is organized at least by application.

64. The system of claim 1, wherein the at least one report generation process is adapted to provide at least one report that lists a total number of voice records that are completely transcribed and which report is organized at least by client.

65. The system of claim 1, wherein the at least one report generation process is adapted to provide at least one report that lists a total number of voice records that are completely transcribed and which report is organized at least by transcription entity.

66. The system of claim 1, wherein the at least one report generation process is adapted to provide at least one report which report lists a total number of voice records that are sent to at least one client.

67. The system of claim 1, wherein the at least one report generation process is adapted to provide at least one report that lists a total number of voice records that are sent to at least one client and that is organized by time period.

68. The system of claim 1, wherein the at least one report generation process is adapted to provide at least one report that lists a total number of voice records that are sent to at least one client and that is organized by application supported on behalf of the at least one client.

69. The system of claim 1, wherein the at least one report generation process is adapted to provide at least one report that lists a total number of voice records that are sent to at least one client and that is organized by specific client.

70. The system of claim 1, wherein the at least one report generation process is adapted to provide at least one report that lists a total number of voice records that are sent to at least one client and that is organized by transcription entity.

71. The system of claim 1, wherein the at least one report generation process is adapted to provide a first report to the client and further comprising providing at least a second report to a call center management entity.

72. The system of claim 1, wherein the at least one reconciliation process is adapted to provide at least one report containing reconciliation data.

73. The system of claim 1, wherein the at least one reconciliation process is adapted to provide at least one report containing reconciliation data to at least one client.

74. The system of claim 1, wherein the at least one reconciliation process is adapted to provide at least one report containing reconciliation data to at least one call center management entity.

75. The system of claim 1, wherein the at least one reconciliation process is adapted to provide at least one report reconciling at least one parameter as tracked by the at least one call center with a corresponding at least one parameter as tracked by a second entity other than the at least one call center.

76. The system of claim 1, wherein the at least one reconciliation process is adapted to provide at least one report reconciling a count of voice records sent to at least one given transcription process with a count of corresponding text records received from the at least one transcription process.

77. The system of claim 1, wherein the at least one reconciliation process is adapted to provide at least one report reconciling a count of records sent to at least one transcription process with a count of records acknowledged as received by the at least one transcription process.

78. The system of claim 1, wherein the at least one reconciliation process is adapted to provide at least one report itemizing a status of each of interaction performed by the at least one call center.

79. The system of claim 1, wherein the at least one reconciliation process is adapted to provide at least one report that categorizes each voice record received by the at least one call center as at least one of the following: a complete voice record, an incomplete voice record, a good transcription, and a failed transcription.

80. The system of claim 1, wherein the at least one reconciliation process is adapted to provide at least one report containing counts of voice records created by the at least one call center and counts of voice records reported to at least one client.

81. The system of claim 1, wherein the at least one report generation process is adapted to transmit a plurality of respective reports to a plurality of respective clients.

82. The system of claim 1, wherein the at least one report generation process is adapted to transmit a plurality of reports to a given client, wherein each report lists data relating to a respective application supported on behalf of the given client.

83. The system of claim 1, wherein the at least one report generation process is adapted to transmit a plurality of respective reports to a plurality of respective clients, wherein each report lists data relating to at least one respective application supported on behalf of a given respective client.

84. The system of claim 1, wherein the at least one report generation process is adapted to store at least one of a date and a time at which the at least one report is transmitted.

85. The system of claim 1, wherein the at least one report generation process is adapted to mark at least one field in a data structure as having had its contents reported to a client with which the field is associated.

86. The system of claim 85, wherein the at least one report generation process is adapted to store at least one of a date and a time that the contents of the at least one field are reported to the client.

87. An automated, computer-based method for tracking, reconciling, and reporting on data representing at least one Dual Tone Multi-Frequency (DTMF) tone and at least one voice signal that are communicated between at least one call center, wherein the call center includes a facility, either an in-house facility or at a merchant location or an out-sourced facility to a third-party, and at least one user during at least one interaction therebetween, the method comprising at least the following:

storing DMTF data provided by a given user in a first data store, wherein the data store allocates a space for and stored at least one of a plurality of records;

storing voice data provided by a given user in a second data store, wherein the data store allocates a space for and stored at least one of a plurality of records;

transcribing the voice data into corresponding text;

storing the corresponding text into a voice capture database;

merging the DTMF data with the corresponding text and the voice data;

populating a master database with data from the first data store;

extracting at least some of the data from the master database and compiling a report based on the extracted data;

sending the report to a client, wherein the client can include financial institutions subject to regulatory requirements;

transmitting data to the master database representing when the report was sent to the client;

reconciling the data in the report sent to the client with data stored in the master database; and displaying data resulting from the reconciliation.

88. An automated, computer-based method for tracking, reconciling, and reporting on data representing at least one Dual Tone Multi-Frequency (DTMF) tone and at least one voice signal that are communicated between at least one call center and at least one user during at least one interaction therebetween, the method comprising at least the following:

capturing first data representing at least one DTMF tone generated during a first interaction;

capturing at least second data representing at least one voice signal generated during the first interaction;

creating at least one record to store the first and the at least second data and the voice signal;

determining a completeness parameter associated with the at least one record, wherein a record can check a report for completeness by traversing the record and examining whether a required field associated with the record is populated with at least a first and at least a second data;

generating at least one report containing at least in part the at least one record; and transmitting the at least one report containing at least the DTMF data and the corresponding text to one or more clients wherein the client can include financial institutions subject to regulatory requirements.

89. The method of claim 88, wherein transmitting the at least one report includes transmitting the at least one report to a client of the call center.

90. The method of claim 88, wherein transmitting the at least one report includes transmitting the at least one report to at least one call center management entity.

91. The method of claim 88, wherein capturing first data includes capturing a plurality of DTMF tones from a given user interacting with the at least one call center.

92. The method of claim 88, wherein capturing first data includes capturing at least one DTMF tone from a plurality of users interacting with the at least one call center.

93. The method of claim 88, wherein capturing first data includes capturing a plurality of DTMF tones from a plurality of users interacting with the at least one call center.

94. The method of claim 88, wherein capturing first data includes capturing a plurality of DTMF tones from a plurality of users interacting with the at least one call center, at least two of which users are interacting with two respective programs that are supported by the at least one call center on behalf of different clients of the at least one call center.

95. The method of claim 88, wherein capturing first data includes capturing a plurality of DTMF tones from a plurality of users interacting with a plurality of call centers, at least two of which users are interacting with two respective programs that are supported by respective ones of the plurality of call centers on behalf of different clients of the plurality of call centers.

96. The method of claim 88, wherein capturing at least second data includes capturing a plurality of voice records from at least one user.

97. The method of claim 88, wherein capturing at least second data includes capturing at least one voice record from a plurality of users.

98. The method of claim 88, wherein capturing at least second data includes capturing a plurality of voice records from a plurality of users.

99. The method of claim 88, wherein capturing at least second data includes capturing at least one respective voice record from a plurality of users, at least two of which users are interacting with two respective programs that are supported by the at least one call center on behalf of different clients of the at least one call center.

100. The method of claim 88, wherein capturing first data includes capturing a respective plurality of voice records from a plurality of users interacting with a plurality of call centers, at least two of which users are interacting with two respective programs that are supported by respective ones of the plurality of call centers on behalf of different clients of the plurality of call centers.

101. The method of claim 88, wherein creating at least one record includes allocating space for the at least one record in at least one data store.

102. The method of claim 88, wherein creating at least one record includes allocating space for the at least one record in at least one relational database.

103. The method of claim 88, wherein creating at least one record includes allocating space for the at least one record in at least one object-oriented database.

104. The method of claim 88, wherein creating at least one record includes allocating space in at least one data store, the at least one data store being adapted to store a plurality of records that contain data associated with at least one application that is supported by the at least one call center.

105. The method of claim 88, wherein creating at least one record includes allocating space in at least one data store, the at least one data store being adapted to store a plurality of records that contain data associated with a plurality of applications that are supported by the at least one call center.

106. The method of claim 88, wherein creating at least one record includes allocating space in at least one data store, the data store being adapted to store a plurality of records that contain data associated with a plurality of applications that are supported by a plurality of call centers.

107. The method of claim 88, further comprising merging the data representing the at least one voice record with the data representing the at least one DTMF tone.

108. The method of claim 107, wherein merging the data includes associating the data representing the at least one voice record and the data representing the at least one DTMF tone.

109. The method of claim 107, wherein merging the data includes allocating respective fields for storing the data representing the at least one voice record and the data representing the at least one DTMF tone in at least one given record in at least one data store.

110. The method of claim 107, wherein merging the data includes storing the data representing the at least one voice record and the data representing the at least one DTMF tone in respective fields allocated within at least one given record in at least one data store.

111. The method of claim 107, wherein merging the data includes associating a field storing the data representing the at least one voice record with a field storing the data representing the at least one DTMF tone.

112. The method of claim 107, wherein merging the data includes associating a field storing the data representing the at least one DTMF tone with a field storing the data representing the at least one voice record.

113. The method of claim 107, wherein merging the data includes associating respective fields storing the data representing the at least one DTMF tone and the data representing the at least one voice record using at least one of a pointer and an index.

114. The method of claim 88, wherein determining a completeness parameter includes determining that a given record is complete.

115. The method of claim 88, wherein determining a completeness parameter includes determining that a given record is incomplete.

116. The method of claim 88, wherein determining a completeness parameter includes comparing the at least one record to a specification applicable to the at least one record.

117. The method of claim 88, wherein determining a completeness parameter includes comparing the at least one record to a specification that is provided by the client and that is applicable to the at least one record.

118. The method of claim 88, wherein determining completeness parameter includes examining whether at least one field in the at least one record is populated with data.

119. The method of claim 88, wherein determining completeness parameter includes examining whether a plurality of fields in the at least one record are populated with data.

120. The method of claim 88, wherein determining a completeness parameter includes determining that text corresponding to the data representing the voice signal has been generated.

121. The method of claim 88, further comprising forwarding the data representing at least one voice record for conversion into corresponding text.

122. The method of claim 88, further comprising forwarding the data representing at least one voice record to a transcription process for conversion into corresponding text.

123. The method of claim 88, further comprising forwarding respective data representing a plurality of voice records to a transcription process for conversion into corresponding text.

124. The method of claim 88, further comprising forwarding data representing the at least one voice record to an automated transcription process for conversion into corresponding text.

125. The method of claim 88, further comprising forwarding data representing the at least one voice record to a live operator for transcription into corresponding text.

126. The method of claim 88, further comprising forwarding data representing the at least one voice record to an automated transcription entity for conversion into corresponding text.

127. The method of claim 88, further comprising forwarding data representing the at least one voice record to a transcription entity that is a third party with respect to the call center for conversion into corresponding text.

128. The method of claim 88, further comprising forwarding data representing the at least one voice record to a transcription entity within the call center for conversion into corresponding text.

129. The method of claim 88, further comprising determining that data representing each voice record required to be transcribed for a given call has been converted into corresponding text.

130. The method of claim 88, further comprising determining that text corresponding to a given voice record has been received from a transcription process.

131. The method of claim 88, further comprising populating a field of a data structure with text corresponding to a given voice record.

132. The method of claim 88, further comprising comparing a plurality of populated fields in a data structure with a minimum set of populated fields required by the at least first client.

133. The method of claim 88, further comprising comparing a respective plurality of populated fields in a data structure with a respective minimum set of populated fields required by a plurality of respective clients.

134. The method of claim 88, wherein generating at least one report includes generating at least one report on behalf of the at least one client.

135. The method of claim 88, wherein generating at least one report includes extracting at least one content of at least one field of a data store in response to at least one requirement of a given client.

136. The method of claim 88, wherein generating at least one report includes formatting respective contents of a plurality of fields of at least one data store into at least one report in response to respective requirements specified by a plurality of respective clients.

137. The method of claim 88, wherein generating at least one report includes generating at least one report on behalf of a call center management entity.

138. The method of claim 88, wherein generating at least one report includes generating at least one report that lists a total number of records generated over a given time period.

139. The method of claim 88, wherein generating at least one report includes generating at least one report that lists a total number of records generated while supporting at least one specific application.

140. The method of claim 88, wherein generating at least one report includes generating at least one report that lists a total number of records generated while supporting at least one specific client.

141. The method of claim 88, wherein generating at least one report includes generating at least one report that lists a total number of voice records that are awaiting transcription.

142. The method of claim 88, wherein generating at least one report includes generating at least one report that lists a total number of voice records awaiting transcription tracked over a given time period.

143. The method of claim 88, wherein generating at least one report includes generating at least one report that lists a total number of voice records awaiting transcription and that is organized by application supported on behalf of at least one client.

144. The method of claim 88, wherein generating at least one report includes generating at least one report that lists a total number of voice records awaiting transcription and that is organized by specific client.

145. The method of claim 88, wherein generating at least one report includes generating at least one report that lists a total number of voice records awaiting transcription and that is organized by transcription entity.

146. The method of claim 88, wherein generating at least one report includes generating at least one report that lists a total number of voice records acknowledged as received by at least one transcription entity.

147. The method of claim 88, wherein generating at least one report includes generating at least one report that lists a total number of voice records acknowledged as received by at least one transcription entity and that is organized at least by time period.

148. The method of claim 88, wherein generating at least one report includes generating at least one report that lists a total number of voice records acknowledged as received by at least one transcription entity and that is organized at least by a client for whom the voice record is generated.

149. The method of claim 88, wherein generating at least one report includes generating at least one report that lists a total number of voice records acknowledged as received by at least one transcription entity and that is organized at least by an application for which the voice record is generated.

150. The method of claim 88, wherein generating at least one report includes generating at least one report that lists a total number of voice records that are incompletely transcribed.

151. The method of claim 88, wherein generating at least one report includes generating at least one report that lists a total number of voice records that are incompletely transcribed and that is organized at least by time period.

152. The method of claim 88, wherein generating at least one report includes generating at least one report that lists a total number of voice records that are incompletely transcribed and that is organized at least by an application for which the voice records are generated.

153. The method of claim 88, wherein generating at least one report includes generating at least one report that lists a total number of voice records that are incompletely transcribed and that is organized at least by a client for which the voice records are generated.

154. The method of claim 88, wherein generating at least one report includes generating at least one report that lists a total number of voice records that are incompletely transcribed and that is organized at least by a transcription entity processing the voice records.

155. The method of claim 88, wherein generating at least one report includes generating at least one report that lists a total number of voice records that are completely transcribed.

156. The method of claim 88, wherein generating at least one report includes generating at least one report that lists a total number of voice records that are completely transcribed and that is organized at least by time period.

157. The method of claim 88, wherein generating at least one report includes generating at least one report that lists a total number of voice records that are completely transcribed and that is organized at least by application.

158. The method of claim 88, wherein generating at least one report includes generating at least one report that lists a total number of voice records that are completely transcribed and that is organized at least by client.

159. The method of claim 88, wherein generating at least one report includes generating at least one report that lists a total number of voice records that are completely transcribed and that is organized at least by transcription entity.

160. The method of claim 88, wherein generating at least one report includes generating at least one report that lists a total number of voice records that are sent to at least one client.

161. The method of claim 88, wherein generating at least one report includes generating at least one report that lists a total number of voice records that are sent to at least one client and that is organized by time period.

162. The method of claim 88, wherein generating at least one report includes generating at least one report that lists a total number of voice records that are sent to at least one client and that is organized by application.

163. The method of claim 88, wherein generating at least one report includes generating at least one report that lists a total number of voice records that are sent to at least one client and that is organized by transcription entity.

164. The method of claim 88, wherein generating at least one report includes generating a first report on behalf of the at least one client and further comprising generating at least a second report on behalf of a call center management entity.

165. The method of claim 88, wherein generating at least one report includes generating a report containing reconciliation data.

166. The method of claim 88, wherein generating at least one report includes generating a report containing reconciliation data on behalf of a client.

167. The method of claim 88, wherein generating at least one report includes generating a report containing reconciliation data on behalf of a call center management entity.

168. The method of claim 88, wherein generating at least one report includes generating a report reconciling at least one parameter as tracked by the at least one call center with a corresponding at least one parameter as tracked by a second entity other than the call center.

169. The method of claim 88, wherein generating at least one report includes generating a report reconciling a count of voice records sent to at least one transcription entity with a count of corresponding text records received from the at least one transcription entity.

170. The method of claim 88, wherein generating at least one report includes generating a report reconciling a count of records sent to at least one transcription entity with a count of records acknowledged as received by the at least one transcription entity.

171. The method of claim 88, wherein generating at least one report includes generating a report itemizing a status of each of the interactions conducted by the at least one call center.

172. The method of claim 88, wherein generating at least one report includes generating a report that categorizes each one of a plurality of voice records generated by the call center as at least one of the following: a complete voice record, an incomplete voice record, a good transcription, and a failed transcription.

173. The method of claim 88, wherein generating at least one report includes generating a report containing counts of voice records that are created by the at least one call center and counts of voice records that are reported to at least one client.

174. The method of claim 88, further comprising transmitting a plurality of respective reports to a plurality of respective clients.

175. The method of claim 88, further comprising transmitting a plurality of reports to a given client, wherein respective ones of the reports list data relating to a respective application supported on behalf of the given client.

176. The method of claim 88, further comprising transmitting a plurality of respective reports to a plurality of respective clients, wherein respective ones of the reports list data relating to a respective application supported on behalf of a given respective client.

177. The method of claim 88, further comprising storing at least one of a date and a time at which the at least one report is transmitted.

178. The method of claim 88, further comprising marking at least one field in a data structure as having had its contents reported to a client with which the field is associated.

179. The method of claim 178, further comprising storing at least one of a date and a time that the contents of the at least one field are reported to the client.

180. An automated, computer-based system for tracking, reconciling, and reporting on data representing at least one Dual Tone Multi-Frequency (DTMF) tone and at least one voice signal that are communicated between at least one call center, wherein the call center includes a facility, either an in-house facility or at a merchant location or an out-sourced facility to a third-party, and at least one user during at least one interaction therebetween, the system comprising at least the following:

means for capturing first data representing at least one DTMF tone generated during a first interaction;

means for capturing at least second data representing at least one voice signal generated during the first interaction;

means for creating at least one record to store the first and the at least second data and the voice signal;

means for determining a completeness parameter associated with the at least one record;

means for generating at least one report containing at least in part the at least one record, wherein a record can check a report for completeness by traversing the record and examining whether a required field associated with the record is populated with at least a first and at least a second data; and means for transmitting the at least one report containing at least the DTMF data and the corresponding text to one or more clients, wherein the client can include financial institutions subject to regulatory requirements.

181. A program storage device readable by a machine, tangibly embodying a program of instructions executable by the machine to perform a method for tracking, reconciling, and reporting on data representing at least one Dual Tone Multi-Frequency (DTMF) tone and at least one voice signal that are communicated between at least one call center, wherein the call center includes a facility, either an in-house facility or at a merchant location or an out-sourced facility to a third-party, and at least one user during at least one interaction therebetween, the method comprising at least the following:

capturing first data representing at least one DTMF tone generated during a first interaction;

capturing at least second data representing at least one voice signal generated during the first interaction;

creating at least one record to store the first and the at least second data and the voice signal;

determining a completeness parameter associated with the at least one record, wherein a record can check a report for completeness by traversing the record and examining whether a required field associated with the record is populated with at least a first and at least a second data;

generating at least one report containing at least in part the at least one record; and transmitting the at least one report containing at least the DTMF data and the corresponding text to one or more clients, wherein the client can include financial institutions subject to regulatory requirements.

* * * * *